US007210780B1

(12) United States Patent
Bourdoncle et al.

(10) Patent No.: US 7,210,780 B1
(45) Date of Patent: May 1, 2007

(54) METHOD FOR DETERMINATION OF AN OPHTHALMIC LENS

(75) Inventors: Bernard Bourdoncle, Paris (FR); Gildas Marin, Antony (FR)

(73) Assignee: Essilor International (Compagnie Generale D'Optique) (FR)

( * ) Notice: Subject to any disclaimer, the term of this patent is extended or adjusted under 35 U.S.C. 154(b) by 0 days.

(21) Appl. No.: 11/453,346

(22) Filed: Jun. 14, 2006

(30) Foreign Application Priority Data

Dec. 16, 2005 (FR) .................................. 05 12822

(51) Int. Cl.
*G02C 7/06* (2006.01)

(52) U.S. Cl. ...................................... 351/169; 351/177
(58) Field of Classification Search ................ 351/168, 351/169, 177
See application file for complete search history.

(56) References Cited

U.S. PATENT DOCUMENTS

| | | | |
|---|---|---|---|
| 4,055,379 A | 10/1977 | Winthrop | |
| 4,606,626 A | 8/1986 | Shinohara | |
| 4,854,689 A | 8/1989 | Dufour et al. | |
| 5,270,745 A | 12/1993 | Pedrono | |
| 5,272,495 A | 12/1993 | Pedrono | |
| 5,488,442 A | 1/1996 | Harsigny et al. | |
| 5,784,144 A * | 7/1998 | Kelch et al. | 351/169 |
| 5,812,238 A | 9/1998 | Ahsbahs et al. | |
| 5,949,519 A | 9/1999 | Le Saux et al. | |
| 6,102,544 A | 8/2000 | Baudart et al. | |
| 6,116,734 A | 9/2000 | Pedrono et al. | |
| 6,260,967 B1 | 7/2001 | Edwards et al. | |
| 6,318,859 B1 | 11/2001 | Baudart et al. | |
| 6,382,789 B1 | 5/2002 | Baudart et al. | |
| 6,540,354 B2 | 4/2003 | Chauveau et al. | |
| 6,595,637 B2 | 7/2003 | Ahsbahs et al. | |
| 6,595,638 B2 | 7/2003 | Ahsbahs et al. | |
| 6,652,096 B1 | 11/2003 | Morris et al. | |
| 6,682,194 B2 | 1/2004 | Ahsbahs et al. | |

(Continued)

FOREIGN PATENT DOCUMENTS

DE 103 45 214 4/2005

(Continued)

OTHER PUBLICATIONS

W.N. Charman et al., "Astigmatism, accommodation, and visual instrumentation", *Applied Optics*, vol. 17, No. 24, pp. 3903-3910 (Dec. 15, 1978).

(Continued)

*Primary Examiner*—Scott J. Sugarman
(74) *Attorney, Agent, or Firm*—Fish & Richardson P.C.

(57) ABSTRACT

The subject of the invention is a method for determination by optimization of an ophthalmic lens for a wearer for whom a power addition has been prescribed. The method proposes using as a target for the optimization of the lens, under wearing conditions, a difference of the mean orientation of the axes of resulting astigmatism to the vertical of less than 2.5° in a first control zone delimited by an ellipse centred on the progression meridian at half height between the fitting cross and the near vision reference point, said ellipse having a major axis greater than 35° and a minor axis comprised between 3.8° and 4.5°.

The invention allows improvement in the performances of the progressive multifocal lenses in intermediate vision.

13 Claims, 7 Drawing Sheets

U.S. PATENT DOCUMENTS

| | | |
|---|---|---|
| 6,793,340 B1 | 9/2004 | Morris et al. |
| 2002/0171803 A1 | 11/2002 | Ahsbahs et al. |
| 2002/0176048 A1 | 11/2002 | Ahsbahs et al. |
| 2002/0180928 A1 | 12/2002 | Ahsbahs et al. |
| 2003/0156251 A1 | 8/2003 | Welk et al. |

FOREIGN PATENT DOCUMENTS

| | | |
|---|---|---|
| EP | 0 990 939 | 4/2000 |
| FR | 2 588 973 | 4/1987 |
| FR | 2 683 642 | 5/1993 |
| FR | 2 699 294 | 6/1994 |
| FR | 2 704 327 | 10/1994 |
| FR | 2 753 805 | 3/1998 |
| FR | 2 769 997 | 4/1999 |
| FR | 2 769 998 | 4/1999 |
| FR | 2 769 999 | 4/1999 |
| FR | 2 770 000 | 4/1999 |
| FR | 2 809 193 | 11/2001 |
| FR | 2 820 515 | 8/2002 |
| FR | 2 820 516 | 8/2002 |
| GB | 2 277 997 | 11/1994 |
| WO | WO 98/12590 | 3/1998 |
| WO | WO 03/048841 | 6/2003 |

OTHER PUBLICATIONS

Rainer G. Dorsch et al., "Coma and Design Characteristics of Progressive Addition Lenses", *Vision Science and Its Applications*, Technical Digest Series vol. 1; Sante Fe, New Mexico pp. SaA3-1/68-SaA3-4/71 (Feb. 6-9, 1998).

Eloy A. Villegas et al., "Spatially Resolved Wavefront Aberrations of Ophthalmic Progressive-Power Lenses in Normal Viewing Conditions", *Optometry and Vision Science*, vol. 80, No. 2, pp. 106-114 (Feb. 2003).

French Search Report dated Sep. 14, 2006 for French Application No. FR 0512822.

Gunther H. Guilino, "Design philosophy for progressive addition lenses", *Applied Optics*, vol. 32, No. 1, pp. 111-117 (Jan. 1, 1993).

Dr. Gunter Minkwitz, "Erganzende Bemerkungen zum so genannten, Satz von Minkwitz", *Doz Optometrie & Fashion*, vol. 60, No. 9, pp. 44-48 (Sep. 1, 2005).

Stefanie Schuldt, "ysis—Naturliches Sehen erleben", *Doz Optometrie & Fashion*, vol. 59, No. 5, pp. 38-43 (May 3, 2004).

European Office Action for EP 06 29 0653 dated Sep. 15, 2006.

\* cited by examiner

METHOD FOR DETERMINATION OF AN OPHTHALMIC LENS

CROSS REFERENCE TO RELATED APPLICATIONS

Pursuant to U.S.C. § 119, this application claims the benefit of French Patent Application 05 12 822, filed Dec. 16, 2005. The contents of the prior application is incorporated herein by reference in its entirety.

TECHNICAL FIELD

This invention relates to a method for determination of an ophthalmic lens and an ophthalmic lens obtained by such a method.

BACKGROUND

Any ophthalmic lens intended to be held in a frame involves a prescription. The ophthalmic prescription can include a positive or negative power prescription as well as an astigmatism prescription. These prescriptions correspond to corrections enabling the wearer of the lenses to correct defects of his vision. A lens is fitted in the frame in accordance with the prescription and with the position of the wearer's eyes relative to the frame.

In the simplest cases, the prescription is nothing more than a positive or negative power prescription. The lens is said to be unifocal and has a rotational symmetry. It is fitted in a simple manner in the frame so that the principal viewing direction of the wearer coincides with the axis of symmetry of the lens.

For presbyopic wearers, the value of the power correction is different for far vision and near vision, due to the difficulties of accommodation in near vision. The prescription thus comprises a far vision power value and an addition (or power progression) representing the power increment between far vision and near vision; this comes down to a far vision power prescription and a near vision power prescription. Lenses suitable for presbyopic wearers are progressive multifocal lenses; these lenses are described for example in FR-A-2 699 294, U.S. Pat. No. 5,270,745 or U.S. Pat. No. 5,272,495, FR-A-2 683 642, FR-A-2 699 294 or also FR-A-2 704 327. Progressive multifocal ophthalmic lenses include a far vision zone, a near vision zone and an intermediate-vision zone, a principal progression meridian crossing these three zones. They are generally determined by optimization, based on a certain number of constraints imposed on the different characteristics of the lens. These lenses are all-purpose lenses in that they are adapted to the different needs of the wearer at the time. Families of progressive multifocal lenses are defined, each lens of a family being characterized by an addition which corresponds to the power variation between the far vision zone and the near vision zone. More precisely, the addition, referenced A, corresponds to the power variation on the meridian between a point FV of the far vision zone and a point NV of the near vision zone, which are respectively called far vision reference point and near vision reference point, and which represent the points of intersection of viewing with the surface of the lens for far distance vision and for reading vision.

Independently of the power and power addition prescription, a wearer may be prescribed an astigmatism correction. Such an astigmatism prescription is produced by the ophthalmologist in the form of a pair formed by an axis value (in degrees) and an amplitude value (in diopters). On a surface, the amplitude value represents the difference between the principal curvatures; the axis value represents the orientation, relative to a reference axis and in a conventional direction of rotation, of one of the two curvatures according to the formula that is chosen to be used. In practice there are two conventions, the so-called "negative cylinder" convention, in this case, if $1/R_1$ is the maximum curvature and $1/R_2$ the minimum curvature, the amplitude value is $(1/R_2-1/R_1)$ and the axis is the orientation, relative to the reference axis, of the maximum curvature $1/R_1$, and the so-called "positive cylinder" convention, in this case the amplitude value is $(1/R_1-1/R_2)$ and the axis is the orientation, relative to the reference axis, of the minimum curvature $1/R_2$. The reference axis is horizontal and the direction of rotation is the counterclockwise direction when looking at the wearer. An axis value of +45° therefore represents an obliquely orientated axis, which, when looking at the wearer, extends from the top-right quadrant to the bottom-left quadrant. In astigmatism prescription terms, the amplitude value represents the difference between the minimum and maximum powers in a given direction and the axis represents the orientation of the maximum power if the astigmatism value is negative (the axis represents the orientation of the minimum power if the astigmatism value is positive). Such an astigmatism prescription is measured in far vision of the wearer. Although it is linguistically incorrect, the term astigmatism is often used for the amplitude of the astigmatism whereas this term refers to the amplitude/angle pair. The context allows a person skilled in the art to understand which meaning is intended.

Moreover, the laws of the optics of ray tracings mean that optical defects appear when the light rays deviate from the central axis of any lens. These known defects, which include amongst others a curvature or power defect and an astigmatism defect, can be generically called obliquity defects of rays.

A person skilled in the art knows how to compensate for these defects. For example, EP-A-0 990 939 proposes a method for determination by optimization of an ophthalmic lens for a wearer having an astigmatism prescription. This document proposes choosing a target lens and using a ray tracing method and minimizing the difference between the residual astigmatism and the astigmatism of the target lens. Residual astigmatism is defined in this document as the differences in amplitude and axis between the prescribed astigmatism and the astigmatism generated by the lens. This method allows a better adaptation of the lenses to astigmatic wearers, avoiding the optical aberrations caused by the addition of a toric surface. The calculation is carried out at a reference point linked to the eye, which allows account to be taken of the torsion effect of the eye when the wearer looks in an off-centered direction.

The obliquity defects have also been identified for progressive multifocal lenses. For example, WO-A-98 12590 describes a method for determination by optimization of a set of multifocal ophthalmic lenses. This document proposes defining the set of lenses in consideration of the optical characteristics of the lenses and in particular the wearer power and oblique astigmatism, under wearing conditions. The lens is optimized by ray tracing, using an ergorama linking a target object point with each direction of viewing under wearing conditions. This ergorama provides targets for an optimization of the lenses by ray tracing in order to calculate the wearer power and the resulting astigmatism at each point of the lens through which the line of vision passes.

SUMMARY

The astigmatism defect or resulting astigmatism is a defect which is inherent in progressive lenses; it can therefore be considered to be a tolerable defect, at least in the peripheral zone of the lens. In the intermediate-vision zone of a progressive multifocal lenses, the width between the isoastigmatism lines is essentially controlled by the rate of power variation along the meridian.

Progressive multifocal lenses are generally optimized by controlling the power variation along the meridian and by setting a resulting astigmatism which is nil on the meridian. Moreover, the intermediate-vision zone is generally optimized by controlling the width of a zone around the meridian where the modulus of the resulting astigmatism is kept below a value which is not considered to be disruptive.

Although the astigmatism prescription contains an axis value in addition to the modulus, as defined previously, only the modulus of the resulting astigmatism is usually considered in the optimization of a progressive ophthalmic lens. The resulting astigmatism is the remainder of the vectorial subtraction of the effective astigmatism introduced by the lens under wearing conditions from the astigmatism prescribed for the wearer. The resulting astigmatism therefore has an axis.

Now, it was observed that when astigmatism is present, the visual system prefers to position the vertical focus on the retina, either with its remaining accommodation or by adjusting the necessary power. These observations were made in the context of the doctoral thesis of C. Miège on the accommodative function of the human eye or in the article by Charman & al., "Astigmatism, accommodation and visual instrumentation" published in the journal Applied Optics, Vol. 17, No. 24, pp. 3903–3910, 1978.

Thus a progressive lens comprising an intermediate-vision zone in which the axis of astigmatism is kept vertical would satisfy the physiological requirements of most wearers and would provide an impression of a broader field of vision.

A need still exists for a lens which is better suited to presbyopic wearers. The invention proposes controlling the values of the axis of the resulting astigmatism in addition to the values of the modulus of the astigmatism which results on a progressive multifocal lens.

Consequently, the invention proposes a method for determination of a progressive multifocal ophthalmic lens comprising the steps of:

choosing a starting lens having a fitting cross marking a primary viewing direction under wearing conditions and a substantially umbilical progression meridian having a power addition greater than or equal to 2 diopters between a far vision reference point and a near vision reference point;

defining a current lens equal to the starting lens;

optimization, under wearing conditions, of the current lens using as targets:

a progression length less than or equal to 25°, the progression length being defined as the angle of lowered viewing from the fitting cross to the point of the meridian at which the wearer's optical power reaches 85% of the addition prescription; and a difference of the mean orientation of the axes of resulting astigmatism to the vertical of less than 2.5° in a first control zone delimited by an ellipse centred on the progression meridian at half height between the fitting cross and the near vision reference point, said ellipse having a major axis greater than 35° and a minor axis comprised between 3.8° and 4.5°.

According to one characteristic, the optimization step of the method also uses as target a difference of the mean orientation of the axes of resulting astigmatism to the vertical of less than 3° in a second control zone delimited by an ellipse centred on the progression meridian at half height between the fitting cross and the near vision reference point, said ellipse having a major axis greater than 35° and a minor axis comprised between 7.5° and 8.5°.

According to one characteristic, the optimization step of the method also uses as target a difference of the mean orientation of the axes of resulting astigmatism to the vertical of less than 3.5° in a third control zone delimited by an ellipse centred on the progression meridian at half height way between the fitting cross and the near vision reference point, said ellipse having a major axis greater than 35° and a minor axis comprised between 11° and 13°.

According to one characteristic, for a wearer for whom an astigmatism correction has been prescribed, the optimization of the current lens comprises a step consisting of vectorially subtracting the prescribed astigmatism from the astigmatism generated by the lens under wearing conditions.

The invention also proposes a progressive multifocal ophthalmic lens with a complex surface having:

a fitting cross marking the primary viewing direction under wearing conditions;

a substantially umbilical progression meridian having a power addition greater than or equal to 2 diopters between a far vision reference point and a near vision reference point;

the lens having, under wearing conditions and reduced to a plain prescription in far vision by adjustment of the radii of curvature of at least one of its faces:

a progression length less than or equal to 25°, the progression length being defined as the angle of lowered viewing from the fitting cross to the point of the meridian at which the wearer's optical power reaches 85% of the addition prescription;

a difference of the mean orientation of the axes of resulting astigmatism to the vertical of less than 2.5° in a first control zone delimited by an ellipse centred on the progression meridian at half height between the fitting cross and the near vision reference point, said ellipse having a major axis greater than 35° and a minor axis comprised between 3.8° and 4.50.

According to one characteristic, the lens also has, under wearing conditions and reduced to a plain prescription in far vision by adjustment of the radii of curvature of at least one of its faces, a difference of the mean orientation of the axes of resulting astigmatism to the vertical of less than 3° in a second control zone delimited by an ellipse centred on the progression meridian at half height between the fitting cross and the near vision reference point, said ellipse having a major axis greater than 35° and a minor axis comprised between 7.5° and 8.5°.

According to one characteristic, the lens also has, under wearing conditions and reduced to a plain prescription in far vision by adjustment of the radii of curvature of at least one of its faces, a difference of the mean orientation of the axes of resulting astigmatism to the vertical of less than 3.5° in a third control zone delimited by an ellipse centred on the progression meridian at half height between the fitting cross and the near vision reference point, said ellipse having a major axis greater than 35° and a minor axis comprised between 11° and 13°.

According to one characteristic, the major axis of the ellipse delimiting the control zone of the mean orientation of the axes of resulting astigmatism is comprised between 35° and 36°.

The invention also relates to a visual device comprising at least one lens according to the invention and a method for correcting the vision of a presbyopic subject, which comprises providing the subject with, or the wearing by the subject of, such a device.

DESCRIPTION OF DRAWINGS

Other advantages and characteristics of the invention will become apparent on reading the following description of the embodiments of the invention, given by way of example and with reference to the drawings which show.

DETAILED DESCRIPTION

In a manner known per se, at any point of an aspherical surface, a mean sphere D given by the formula:

$$D = \frac{n-1}{2}\left(\frac{1}{R_1} + \frac{1}{R_2}\right)$$

is defined, where $R_1$ and $R_2$ are the maximum and minimum radii of curvature expressed in meters, and n is the index of the material constituting the lens.

A cylinder C, given by the formula:

$$C = (n-1)\left|\frac{1}{R_1} - \frac{1}{R_2}\right|$$

is thus defined.

Figure 1:
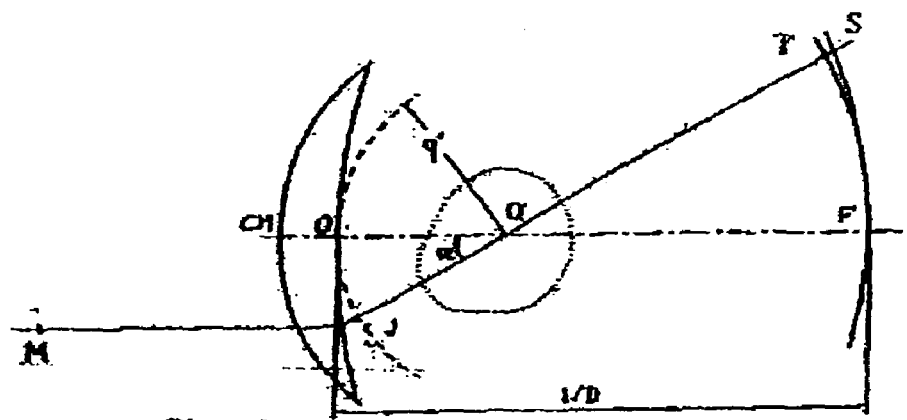
FIG. 1, a diagram of an eye-lens optical system, in vertical cross section.

For a given lens, the corresponding optical variables are defined, namely a power and an astigmatism, under wearing conditions. FIG. 1 shows a diagram of an eye-and-lens optical system in top view, and shows the definitions used hereafter in the description. The centre of rotation of the eye is called Q'; the axis Q'F' represented in the figure in chain-dotted lines is the horizontal axis passing through the centre of rotation of the eye and continuing in front of the wearer—in other words the axis Q'F' corresponds to the primary viewing direction. This axis cuts, on the front face, a point on the lens called the fitting cross, which is marked on the lenses in order to allow their positioning by an optician; this fitting cross FC makes it possible to locate on the lens the primary viewing direction under wearing conditions. Let point O be the point of intersection of the rear face and this axis Q'F'. A sphere of the vertices is defined, with a centre Q', and a radius q', which cuts the rear face of the lens at the point O. By way of example, a radius q' value of 27 mm corresponds to a current value and produces satisfactory results when the lenses are worn. The section of the lens can be drawn in the plane (O, x, y) which is defined with reference to FIG. 2. The tangent to this curve at the point O is inclined relative to the axis (O, y) at an angle called the pantoscopic angle. The value of the pantoscopic angle is currently 8°. The section of the lens can also be drawn in the plane (O, x, z). The tangent to this curve at the point O is inclined relative to the axis (O, z) at an angle called the curving contour. The value of the curving contour is currently 0°.

These conditions of fitting of the lens relative to the eye, namely:

a distance of 27 mm between the centre of rotation of the eye and the rear face of the lens, on the axis Q'F';

a pantoscopic angle of 8°;

a curving contour of 0° are hereafter called wearing conditions.

These values are those chosen for the examples described but they can vary in order to be equal to values peculiar to each individual.

A given direction of viewing—represented in solid lines in FIG. 1—corresponds to a position of the eye in rotation about Q' and to a point J of the sphere of the vertices; a direction of viewing can also be marked, in spherical coordinates, by two angles α and β. The angle α is the angle formed between the axis Q'F' and the projection of the straight line Q'J over the vertical plane containing the axis Q'F'; this angle appears in the diagram of FIG. 1. The angle β is the angle formed between the axis Q'F' and the projection of the straight line Q'J over the horizontal plane containing the axis Q'F'. A given direction of viewing therefore corresponds to a point J of the sphere of the vertices or to a pair (α, β).

Figure 2:
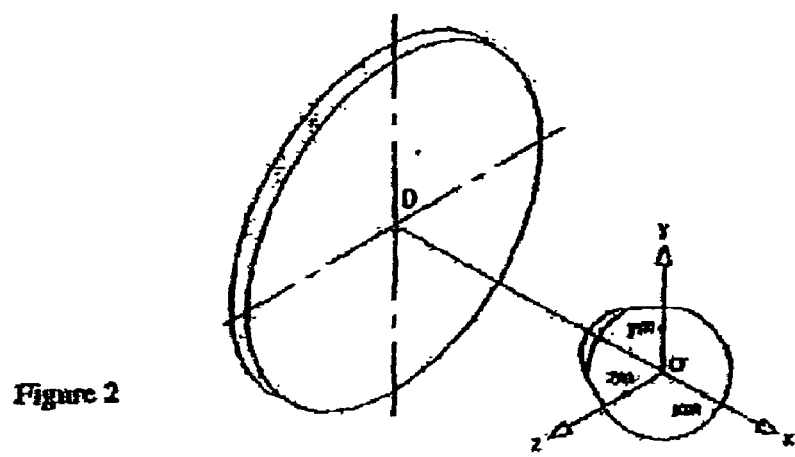
FIGS. 2 and 3, perspective diagrams of an eye-lens system.
Figure 3:
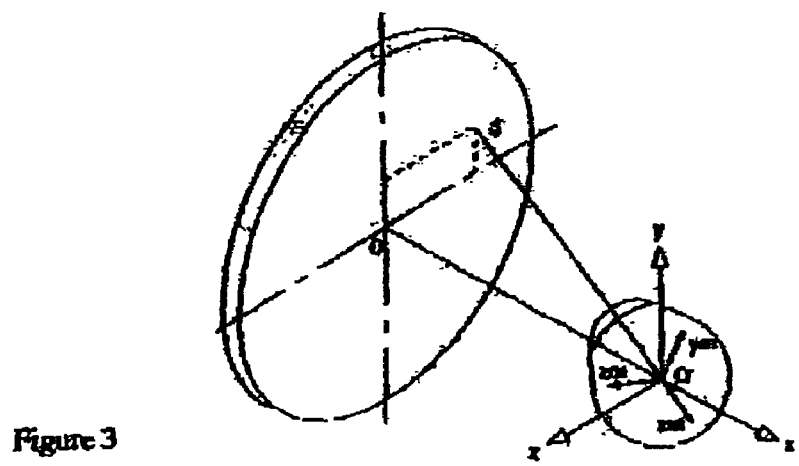

FIGS. 2 and 3 show perspective diagrams of an eye-lens system. FIG. 2 shows the position of the eye and of the reference frame linked to the eye, in the principal viewing direction, α=β=0, called the primary viewing direction. The points J and O have thus merged. FIG. 3 shows the position of the eye and of the reference frame which is linked to it in one direction (α, β). In FIGS. 2 and 3 a fixed reference frame {x, y, z} and a reference frame {$x_m, y_m, z_m$} linked to the eye are represented, in order to show the rotation of the eye clearly. The origin of the reference frame {x, y, z} is the point Q'; the x axis is the axis Q'F'—the point F' not being represented in FIGS. 2 and 3 and passes through the point O; this axis is orientated from the lens towards the eye. The plane {y, z} is the vertical plane; the y axis is vertical and orientated upwards; the z axis is horizontal, the reference frame being directly orthonormalized. The reference frame {$x_m, y_m, z_m$} linked to the eye has the point Q' as its centre; the axis $x_m$ is given by the direction JQ' of viewing, and coincides with the reference frame {x, y, z} for the primary direction of viewing. Listing's law gives the relationships between the reference points {x, y, z} and {$x_m, y_m, z_m$}, for each direction of viewing, see Legrand, *Optique Physiologique*, Volume 1, Edition de la Revue d'Optique, Paris 1965.

In a given direction of viewing, the image of a point M of the object space situated at a given object distance forms between two points S and T corresponding to minimum and maximum distances JT and JS (which are sagittal and tangential focal distances in the case of revolution surfaces, and of a point M at infinity). The angle γ marked as the axis of astigmatism in the so-called "positive cylinder" convention is the angle formed by the image corresponding to the greatest distance with the axis ($z_m$), in the plane ($z_m$, $y_m$) defined with reference to FIGS. 2 and 3. The angle γ is measured in counterclockwise direction when looking at the wearer. In the example of the figure, on the axis Q'F', the image of a point of the object space at infinity forms at the point F'; the points S and T have merged, which is another way of saying that the lens is locally spherical in the primary direction of viewing.

A function linking the usual distance of the object point with each direction of viewing is called an ergorama. Typically, in far vision in the primary direction of viewing, the object point is at infinity. In near vision, in a direction substantially corresponding to an angle α of the order of 5° and to an angle β of the order of 35°, the object distance is of the order of 30 to 50 cm. For more details of a possible definition of an ergorama, FR-A-2 753 805 (U.S. Pat. No. 6,318,859) may be consulted. This document describes an ergorama, its definition and a method for its modelization. A particular ergorama consists of taking only points at infinity. For the method of the invention, points at infinity or not at infinity can be considered. The ergorama can also be a function of the ametropia of the wearer.

Using these data, a power and an astigmatism can be defined in each direction of viewing. For a direction of viewing (α, β), an object point M at an object distance given by the ergorama is considered. The points S and T between which the image of the object forms are determined. The image proximity IP is then given by $$IP = \frac{1}{2}\left(\frac{1}{JT} + \frac{1}{JS}\right)$$

while the object proximity OP is the reciprocal of the distance between the point M and the point J of the sphere of the vertices. The power is defined as the sum of the object and image proximities, i.e.

$$P = OP + IP = \frac{1}{MJ} + \frac{1}{2}\left(\frac{1}{JT} + \frac{1}{JS}\right)$$

The amplitude of the astigmatism is given by $$A = \left|\frac{1}{JT} - \frac{1}{JS}\right|$$

The angle of the astigmatism is the angle γ defined above: it is the angle measured at a reference frame linked to the eye, relative to the direction $z_m$, with which the image S forms, in the plane ($z_m$, $y_m$) These definitions of power and of astigmatism are optical definitions, under wearing conditions in a reference frame linked to the eye. Qualitatively, the thus defined power and astigmatism correspond to the characteristics of a thin lens, which, fitted instead of the lens in the direction of viewing, provides the same images locally. It is noted that, in the primary direction of viewing, the definition provides the standard value of the astigmatism.

The thus defined power and astigmatism can be experimentally measured on the lens using a frontofocometer; they can also be calculated by ray tracing under wearing conditions.

In order to approximate the formulae used by ophthalmologists when prescribing, the maximum power of the lens can also be defined as:

$$P_{max} = \frac{1}{MJ} + \frac{1}{JT}$$

and the minimum power as:

$$P_{min} = \frac{1}{MJ} + \frac{1}{JS}$$

Ophthalmologists prescribe for power and for astigmatism, providing either:

the minimum value of the power $P_{min}$ and a positive astigmatism amplitude value;

the maximum value of the power $P_{max}$ and a negative astigmatism amplitude value.

It is clear that the astigmatism angle values in the prescription vary according to the prescription convention used. In each of the two prescription convention, the angle that the image, S or T, forms is given, corresponding to the recommended power, with the axis $z_m$ measured in counterclockwise direction when looking at the wearer. The angle γ of the so-called "positive cylinder" convention is obtained when the astigmatism amplitude value is positive; the axis of astigmatism then being the least powerful angle of the focal length relative to a horizontal reference axis.

The invention proposes, in order to determine the characteristics of a progressive ophthalmic lens, to control not only the modulus of the resulting astigmatism but also the axis of the resulting astigmatism. The characteristics of the lens can be determined by optimization as described below.

The lens is placed in front of the eye and the astigmatism introduced by the lens is calculated under wearing conditions, for example by ray tracing. If the wearer has received an astigmatism prescription, this prescription is vectorially subtracted in order to give the astigmatism resulting from the lens. It is understood that the invention applies even when the prescription does not comprise an astigmatism prescription because the progressive lenses cause an astigmatism defect due to the power progression. However, in the case of a prescription for astigmatism of the wearer, the so-called "useful" astigmatism is vectorially subtracted in order to allow the optimization of the astigmatism resulting from the lens. For the optimization of the lens the modulus and the axis of the resulting astigmatism are therefore considered for an ergorama linking a point of the lens with each direction of viewing.

In particular the method for determination of a lens according to the invention proposes to control the values of the axis of the resulting astigmatism in at least one control zone delimited in the intermediate-vision zone of the lens; and preferably in three concentric control zones delimited in the intermediate-vision zone of the lens.

The lens is described in the following with reference to an embodiment which is suitable for presbyopic wearers who have a prescription for a 2 diopter power progression.

Figure 4:
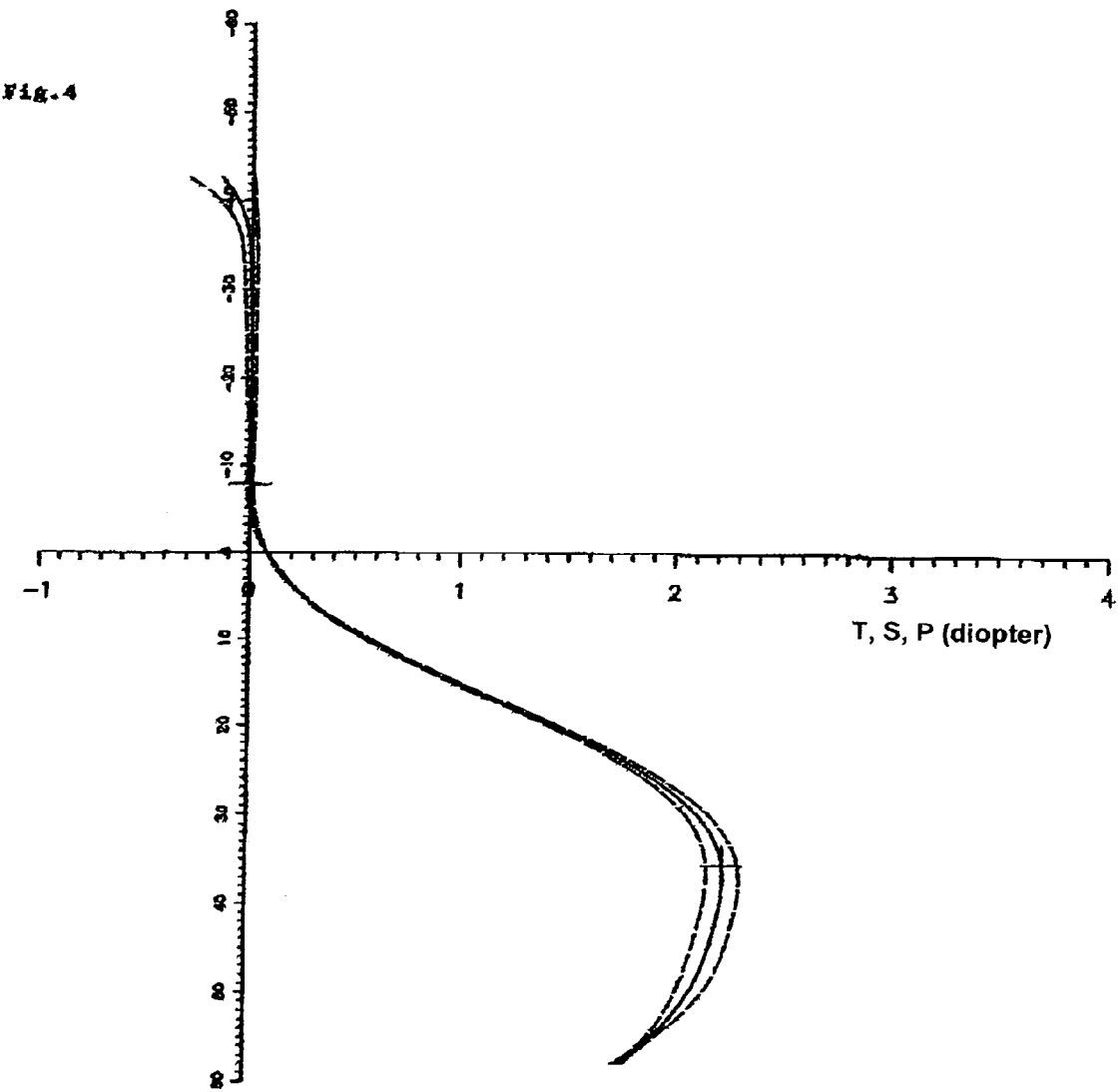
FIG. 4, a graph showing the wearer's optical power along the meridian of the lens according to one embodiment of the invention.
Figure 5:
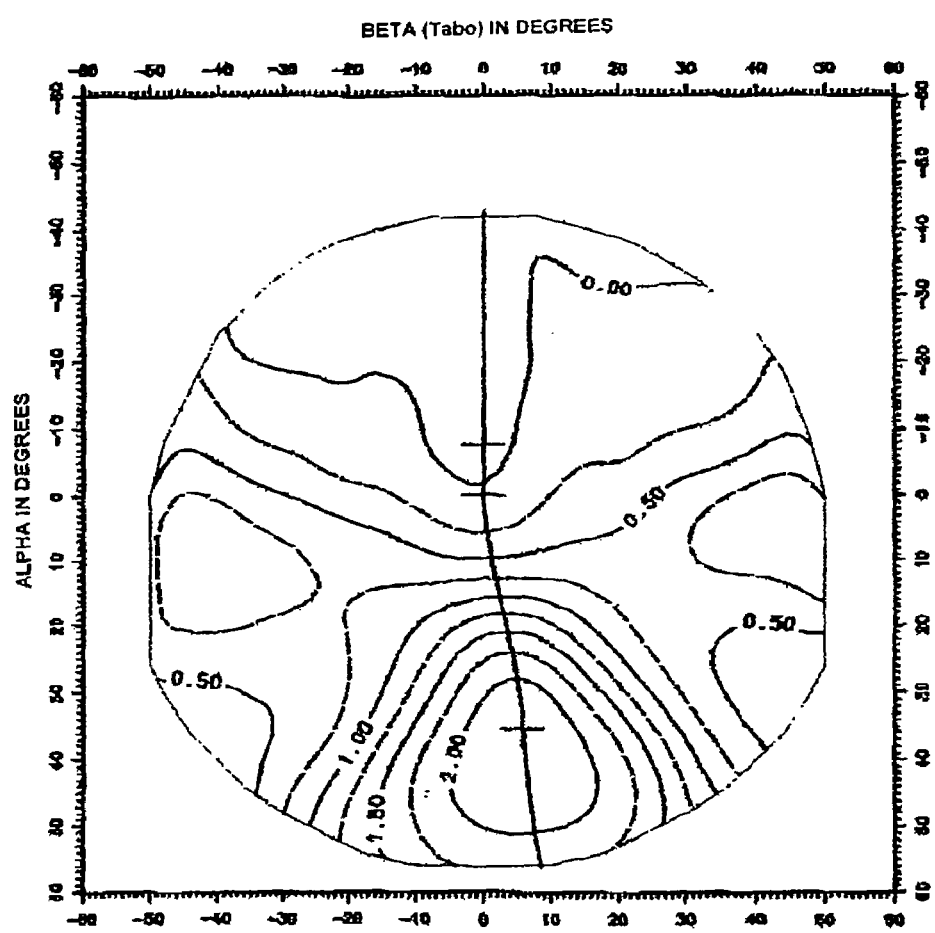
FIG. 5, a map of the wearer's optical power for the lens of FIG. 4.
Figure 6:
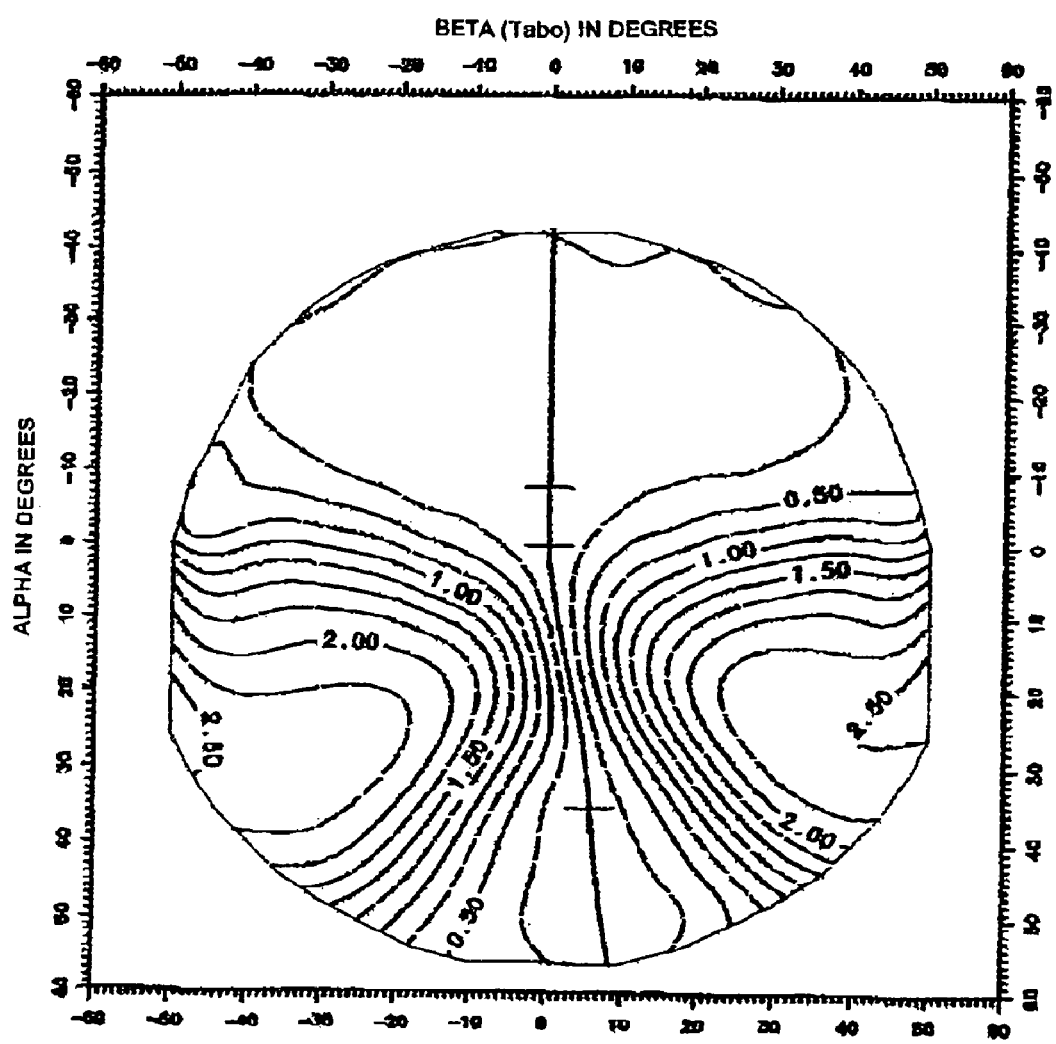
FIG. 6, a map of the modulus of resulting astigmatism for a wearer of the lens of FIG. 4.

FIGS. 4 to 6 show a lens with a diameter of 60 mm with a progressive multifocal front face and comprising a prism of 1.15° with a geometric base orientated at 270° in the TABO reference. The plane of the lens is inclined 8° with respect to the vertical and the lens has a thickness of 1.9 mm. A value of q' of 27 mm (as defined with reference to FIG. 1) was considered for the measurements on the lens of FIGS. 4 to 6.

In FIGS. 5 and 6, the lens is represented at a reference frame in spherical coordinates, the beta angle being plotted on the abscissa and the alpha angle on the ordinates.

The lens has a substantially umbilical line, called a meridian, on which the astigmatism is practically nil. The meridian coincides with the vertical axis in the upper part of the lens and has an inclination on the nose side in the lower part of the lens, the convergence being more marked in near vision.

The figures show the meridian as well as reference points on the lens. The fitting cross FC of the lens can be marked geometrically on the lens by a cross or any other mark such as a point surrounded by a circle marked on the lens, or by any other appropriate means; this is a centring point produced on the lens which is used by the optician to fit the lens in the frame. In spherical coordinates, the fitting cross FC has the coordinates (0, 0) as it corresponds to the intersection point of the front face of the lens and the primary viewing direction, as defined previously. The far vision reference point FV is situated on the meridian and corresponds to raising viewing by 8° above the fitting cross; the far vision reference point FV has the coordinates (0, −8°) in the predefined spherical reference. The near vision reference point NV is situated on the meridian and corresponds to lowering viewing by 35° below the fitting cross; the near vision reference point NV has the coordinates (6°, 35°) in the predefined spherical reference.

FIG. 4 shows a graph of the optical power of the wearer along the meridian; the angle α is plotted on the ordinates and the power on the abscissa in diopters. The minimum and maximum optical powers respectively corresponding to the quantities 1/JS and 1/JT defined previously are shown by dotted lines, and the optical power P as defined previously by a solid line.

It is then possible to note in the figure an optical power of the wearer which is substantially constant around the far vision reference point FV, an optical power of the wearer which is substantially constant around the near vision reference point NV and a regular progression of the power along the meridian. The values are shifted to zero at the origin where the optical power is actually −0.05 diopters corresponding to a plain lens in far vision prescribed for presbyopic emmetropic wearers.

The intermediate-vision zone generally begins, for a progressive multifocal lens, at the fitting cross FC; it is here that the power progression begins. Thus the optical power increases, from the fitting cross to the near vision reference point NV, for values of the angle α of 0 to 35°. For angle values beyond 35°, the optical power becomes substantially constant again, with a value of 2.24 diopters. It is noted that the progression of optical power of the wearer (2.24 diopters) is greater than the prescribed power addition A (2 diopters). This difference of power value is due to oblique effects.

It is possible to define on a lens a progression length PL which is the angular distance—or the difference in ordinates—between the optical centre of the lens—or the fitting cross FC—and a point of the meridian on which the power progression reaches 85% of the prescribed power addition A. In the example of FIG. 4, an optical power of 0.85×2 diopters, i.e. 1.7 diopters, is obtained for a coordinate point of angle α being approximately 23°.

The lens according to the invention thus has an accessibility to the powers required for near vision with a moderate lowering of viewing, less than or equal to 25°. This accessibility guarantees comfortable use of the near vision zone.

FIG. 5 shows the contour lines of the optical power of the wearer defined in a direction of viewing and for an object point. As is standard, the isopower lines are plotted in FIG. 5, in a reference with spherical coordinates, these lines are formed by the points having the same value of optical power P. The 0 diopter to 2 diopter isopower lines are represented.

In FIG. 5 a far vision zone extending above the fitting cross with virtually no variation of power is noted. The value of the optical power of the wearer is thus substantially constant around the fitting cross FC. This virtually nil power variation around the fitting cross allows a certain tolerance of positioning when fitting the lens in the visual device.

FIG. 6 shows the contour lines of the amplitude of the oblique astigmatism under wearing conditions; i.e. the modulus of the resulting astigmatism. As is standard, the isoastigmatism lines are plotted in FIG. 6, in a reference with spherical coordinates, these lines are formed by the points having the same value of astigmatism amplitude as defined previously. The 0.25 diopter to 2.50 diopter isoastigmatism lines are represented.

It is noted that the far vision zone is relatively clear: the isoastigmatism lines greater than 0.25 diopters open out in order to free up the far vision field. It is also noted that the isoastigmatism lines widen, in the lower part of the lens, at the height of the reference point for near vision NV. In the lower part of the lens the 0.75 and 1 diopter isoastigmatism lines are substantially parallel and vertical and delimit a zone containing the near vision reference point NV.

FIGS. 7 to 9 again show the map of the modulus of resulting astigmatism of FIG. 6. In these FIGS. 7 to 9, three different control zones of the axis of astigmatism in the intermediate vision zone of the lens are shown respectively.

Each control zone is defined by an ellipse centred on the meridian at half height between the fitting cross FC and the near vision reference point NV. The major axis of the ellipse follows the meridian; it is greater than or equal to 35°, preferably comprised between 35° and 38°. The ellipse thus surrounds the centring point of the fitting cross FC and the near vision reference point NV. According to the embodiment illustrated in FIGS. 7 to 9, the major axis of each ellipse delimiting the three concentric control zones is equal to 36°.

Figure 7:
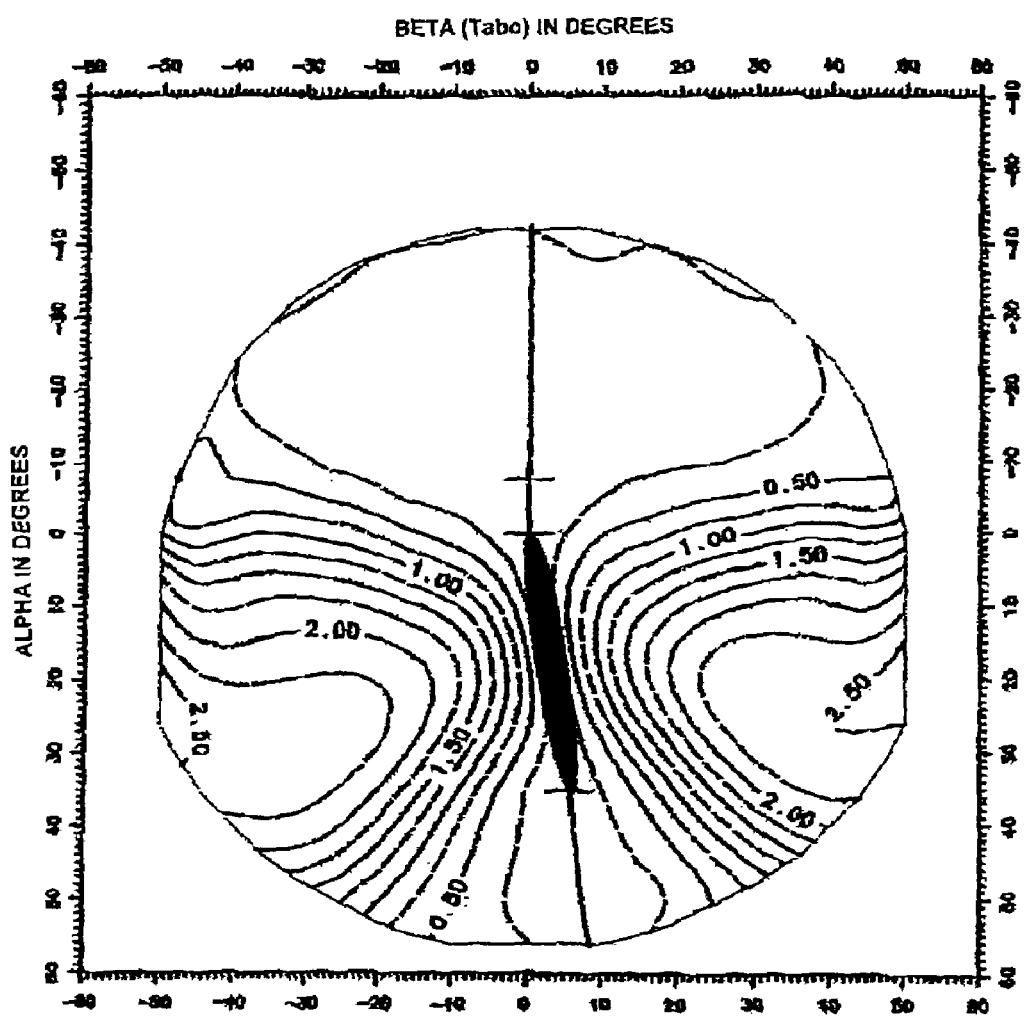
FIG. 7, the map of the modulus of resulting astigmatism of FIG. 6 which shows a first control zone of the axis of the astigmatism.
Figure 8:
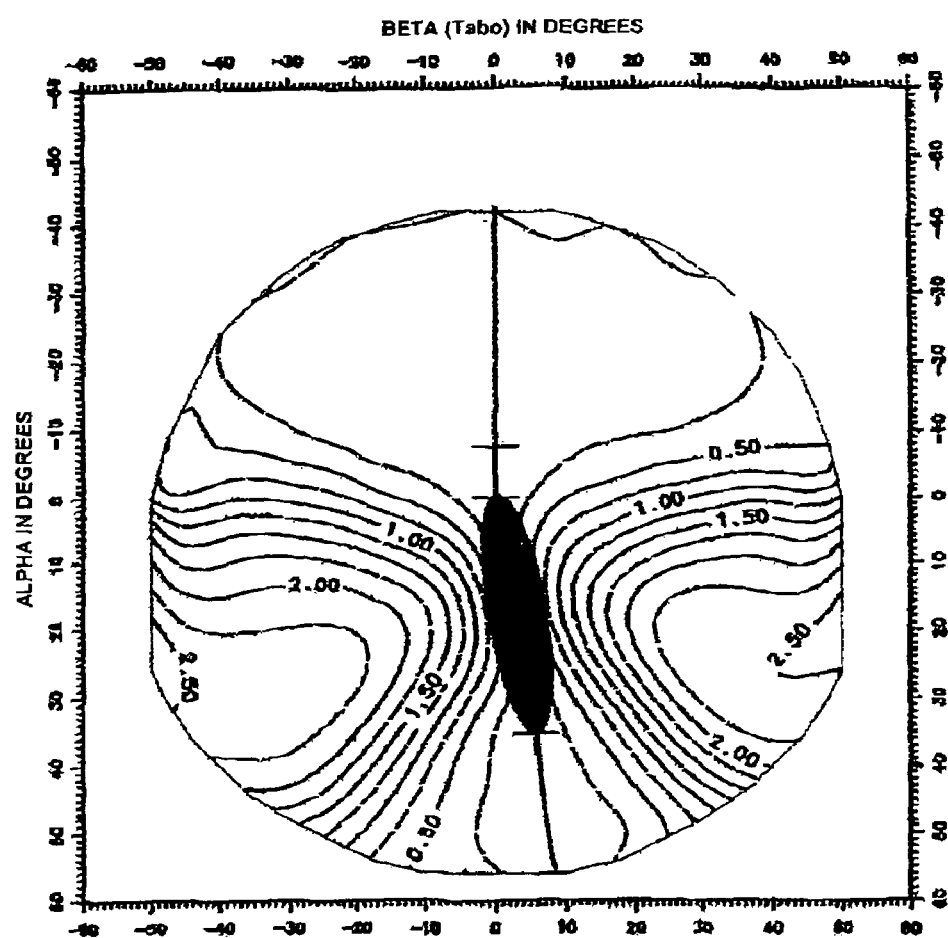
FIG. 8, the map of the modulus of resulting astigmatism of FIG. 6 which shows a second control zone of the axis of the astigmatism.
Figure 9:
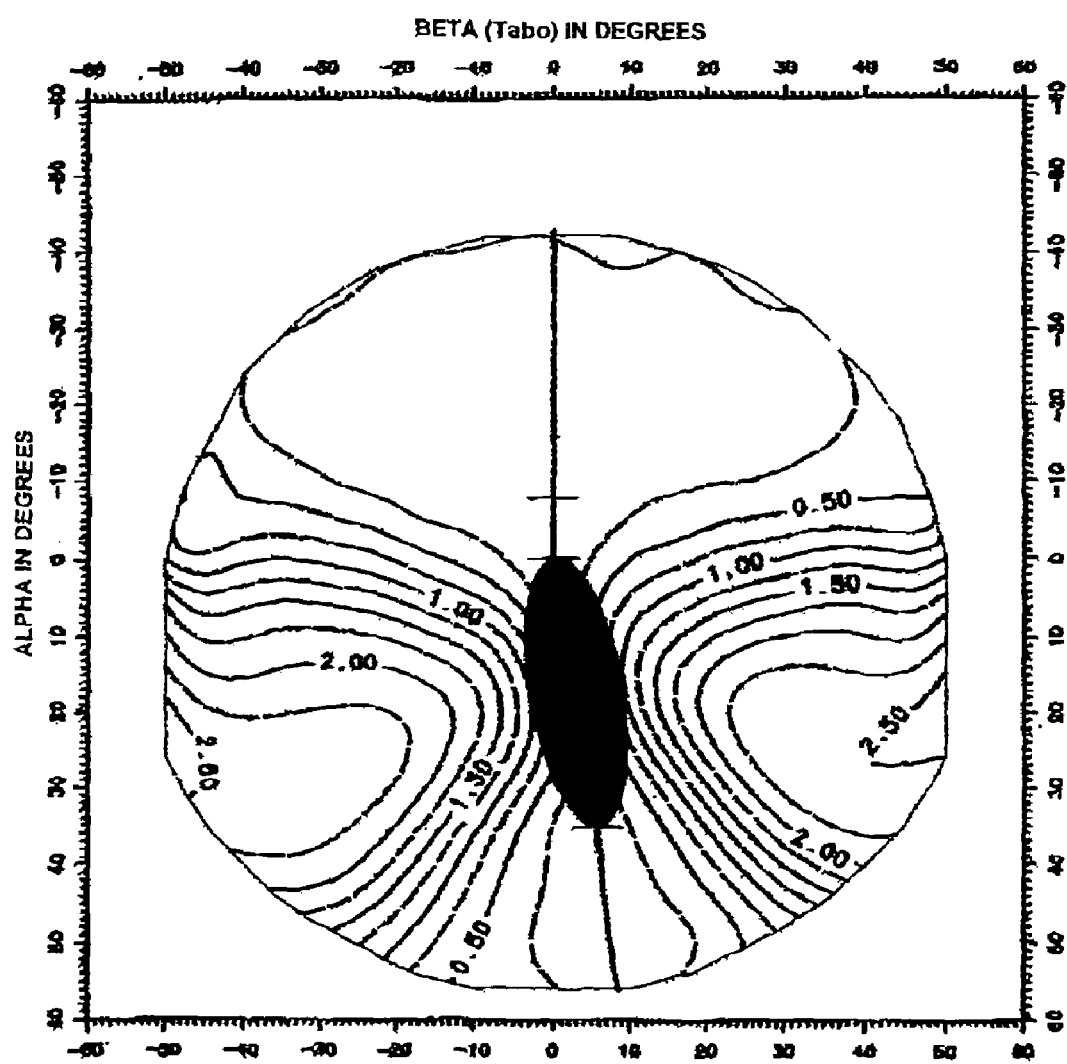
FIG. 9, the map of the modulus of resulting astigmatism of FIG. 6 which shows a third control zone of the axis of the astigmatism.

The minor axis of the ellipse varies between the three control zones represented respectively in FIGS. 7 to 9. A first control zone of the axis of astigmatism, represented in FIG. 7, is delimited by an ellipse as defined previously the minor axis of which is comprised between 3.8° and 4.5°. This minor axis is equal to 4° in the example of FIG. 7. A second control zone, represented in FIG. 8, is delimited by an ellipse as defined previously the minor axis of which is comprised between 7.5° and 8.5°. This minor axis is equal to 8° in the example of FIG. 8. A third control zone, represented in FIG. 9, is delimited by an ellipse as defined previously in which the minor axis is comprised between 11° and 13°. This minor axis is equal to 12° in the example of FIG. 9.

In each of the three control zones, the mean of the orientation of the axes of astigmatism is substantially vertical, i.e. a mean axis value close to 90° according to the convention adopted previously. In the first control zone (FIG. 7), the difference between the mean of the values of the axis of astigmatism and the vertical (90°) is less than 2.5°; in the second control zone (FIG. 8), the difference between the mean of the values of the axis of astigmatism and the vertical is less than 3°; and in the third control zone (FIG. 9) the difference between the mean of the values of the axis of astigmatism and the vertical is less than 3.5°. By way of comparison, for a lens of the prior art marketed by the applicant under the trade mark Varilux Comfort®, the mean orientation of the axes of astigmatism has a difference of approximately 6° with respect to the vertical in the first control zone defined above.

In order to carry out the optimization of a lens according to the invention a lens having at least one complex surface is considered as the starting lens. The lens is considered under wearing conditions, for example with values of distance q' of 27 mm, a pantoscopic angle of 8° and a curving contour of 0°, as proposed above. A lens thickness at the centre, for example a thickness of 1.9 mm and a lens index, for example n=1.665 are chosen.

Targets for the optimization are then fixed, these targets having values of power, of modulus of astigmatism and of axis of astigmatism for given directions of viewing. In particular there is used as target at least one maximum value of difference of the mean orientation of the axes of astigmatism in a first control zone delimited by an ellipse as defined above. A variation of the power along the meridian and in particular a progression length value along the meridian less than 25° is also used as a target. It is also possible to use as a target maximum values of the difference of the mean orientation of the axes of astigmatism in the three control zones delimited by ellipses as defined above. Targets of a modulus of astigmatism can also be fixed in a corridor around the meridian and in the far vision zone.

Once the targets are defined, the lens is determined by optimization. For this purpose, a current lens is considered; on initialization, this current lens is the starting lens. The characteristics of the current lens are varied in order to approach the target values. For this optimization, various representations can be used of the surface or surfaces which vary. In the example, only the rear face of the lens is varied, but the front face could also be varied. The face or faces which vary can be represented by Zernike polynomials; an aspherical layer, superposed on one or other of the faces, can be used and this aspherical layer can be varied. The optimization can use the techniques which are known per se. In particular, the method of optimization by damped least squares (DLS) can be used.

For progressive multifocal lenses, the invention allows improvement in the performances of the lenses in intermediate vision.

What is claimed is:

1. Method for determination of a progressive multifocal ophthalmic lens comprising the steps of:
choosing a starting lens having a fitting cross marking the primary viewing direction under wearing conditions and a substantially umbilical progression meridian having a power addition greater than or equal to 2 diopters between a far vision reference point and a near vision reference point;
defining a current lens equal to the starting lens;
optimization, under wearing conditions, of the current lens using as targets:
a progression length less than or equal to 25°, the progression length being defined as the angle of lowered viewing from the fitting cross to the point of the meridian at which the wearer's optical power reaches 85% of the addition prescription; and
a difference of the mean orientation of the axes of resulting astigmatism to the vertical of less than 2.5° in a first control zone delimited by an ellipse centred on the progression meridian at half height between the fitting cross and the near vision reference point, said ellipse having a major axis greater than 35° and a minor axis comprised between 3.8° and 4.5°.

2. The method for determination of an ophthalmic lens of claim 1, also comprising as target a difference of the mean orientation of the axes of resulting astigmatism to the vertical of less than 3° in a second control zone delimited by an ellipse centred on the progression meridian at half height between the fitting cross and the near vision reference point, said ellipse having a major axis greater than 35° and a minor axis comprised between 7.5° and 8.5°.

3. The method for determination of an ophthalmic lens of claim 1, also comprising as target a difference of the mean orientation of the axes of resulting astigmatism to the vertical of less than 3.5° in a third control zone delimited by an ellipse centred on the progression meridian at half height between the fitting cross and the near vision reference point, said ellipse having a major axis greater than 35° and a minor axis comprised between 11° and 13°.

4. The method for determination of an ophthalmic lens of claim 1, for a wearer for whom an astigmatism correction has been prescribed, in which the optimization of the current lens comprises a step consisting of vectorially subtracting the prescribed astigmatism from the astigmatism generated by the lens under wearing conditions.

5. A progressive multifocal ophthalmic lens with a complex surface having:
a fitting cross marking the primary viewing direction under wearing conditions;
a substantially umbilical progression meridian having a power addition greater than or equal to 2 diopters between a far vision reference point and a near vision reference point;
the lens having, under wearing conditions and reduced to a plain prescription in far vision by adjustment of the radii of curvature of at least one of its faces:
a progression length smaller than or equal to 25°, the progression length being defined as the angle of lowered viewing from the fitting cross to the point of the meridian at which the wearer's optical power reaches 85% of the addition prescription;
a difference of the mean orientation of the axes of resulting astigmatism to the vertical of less than 2.5° in a first control zone delimited by an ellipse centred on the progression meridian at half height between the fitting cross and the near vision reference point, said ellipse having a major axis greater than 35° and a minor axis comprised between 3.8° and 4.5°.

6. The lens of claim 5, also having, under wearing conditions and reduced to a plain prescription in far vision by adjustment of the radii of curvature of at least one of its faces, a difference of the mean orientation of the axes of resulting astigmatism to the vertical of less than 3° in a second control zone delimited by an ellipse centred on the progression meridian at half height between the fitting cross and the near vision reference point, said ellipse having a major axis greater than 35° and a minor axis comprised between 7.5° and 8.5°.

7. The lens of claim 5, also having, under wearing conditions and reduced to a plain prescription in far vision by adjustment of the radii of curvature of at least one of its faces, a difference between the mean orientation of the axes of resulting astigmatism and the vertical of less than 3.5° in a third control zone delimited by an ellipse centred on the progression meridian at half height between the fitting cross and the near vision reference point, said ellipse having a major axis greater than 35° and a minor axis comprised between 11° and 13°.

8. The lens of claim 5, 6 or 7, in which the major axis of the ellipse delimiting the control zone of the mean orientation of the axes of resulting astigmatism is comprised between 35° and 36°.

9. A visual device including at least one progressive multifocal ophthalmic lens with a complex surface having:
  a fitting cross marking the primary viewing direction under wearing conditions;
  a substantially umbilical progression meridian having a power addition greater than or equal to 2 diopters between a far vision reference point and a near vision reference point;
  the lens having, under wearing conditions and reduced to a plain prescription in far vision by adjustment of the radii of curvature of at least one of its faces:
  a progression length smaller than or equal to 25°, the progression length being defined as the angle of lowered viewing from the fitting cross to the point of the meridian at which the wearer's optical power reaches 85% of the addition prescription;
  a difference of the mean orientation of the axes of resulting astigmatism to the vertical of less than 2.5° in a first control zone delimited by an ellipse centred on the progression meridian at half height between the fitting cross and the near vision reference point, said ellipse having a major axis greater than 35° and a minor axis comprised between 3.8° and 4.5°.

10. The visual device of claim 9, wherein the lens has, under wearing conditions and reduced to a plain prescription in far vision by adjustment of the radii of curvature of at least one of its faces, a second control zone having a difference of the mean orientation of the axes of resulting astigmatism to the vertical of less than 3°, wherein said second control zone is delimited by an ellipse centred on the progression meridian at half height between the fitting cross and the near vision reference point, said ellipse having a major axis greater than 35° and a minor axis comprised between 7.5° and 8.5°.

11. The visual device of claim 9, wherein the lens has, under wearing conditions and reduced to a plain prescription in far vision by adjustment of the radii of curvature of at least one of its faces, a third control zone having a difference between the mean orientation of the axes of resulting astigmatism and the vertical of less than 3.5°, wherein said third control zone is delimited by an ellipse centred on the progression meridian at half height between the fitting cross and the near vision reference point, said ellipse having a major axis greater than 35° and a minor axis comprised between 11° and 13°.

12. The visual device of claim 9, 10 or 11, in which the major axis of the ellipse delimiting the control zone of the mean orientation of the axes of resulting astigmatism is comprised between 35° and 36°.

13. A method for correcting the vision of a presbyopic subject, which comprises providing the subject with, or the wearing by the subject of a visual device including at least one progressive multifocal ophthalmic lens with a complex surface having:
  a fitting cross marking the primary viewing direction under wearing conditions;
  a substantially umbilical progression meridian having a power addition greater than or equal to 2 diopters between a far vision reference point and a near vision reference point;
  the lens having, under wearing conditions and reduced to a plain prescription in far vision by adjustment of the radii of curvature of at least one of its faces:
  a progression length smaller than or equal to 25°, the progression length being defined as the angle of lowered viewing from the fitting cross to the point of the meridian at which the wearer's optical power reaches 85% of the addition prescription;
  a difference of the mean orientation of the axes of resulting astigmatism to the vertical of less than 2.5° in a first control zone delimited by an ellipse centred on the progression meridian at half height between the fitting cross and the near vision reference point, said ellipse having a major axis greater than 35° and a minor axis comprised between 3.8° and 4.5°.

* * * * *